United States Patent [19]

Palombo et al.

[11] 4,380,768

[45] Apr. 19, 1983

[54] MAGNETIC PRINTER AND PRINTHEAD

[75] Inventors: Gaston Palombo, Agoura; Stephen M. Fortescue, Northridge, both of Calif.

[73] Assignee: Dataproducts Corporation, Woodland Hills, Calif.

[21] Appl. No.: 174,815

[22] Filed: Aug. 4, 1980

[51] Int. Cl.[3] .......... G01D 15/12

[52] U.S. Cl. .......... 346/74.5

[58] Field of Search .......... 346/74.2, 74.5; 358/301; 360/121, 123, 122; 361/191; 427/47, 427/48; 118/623, 652

[56] References Cited

U.S. PATENT DOCUMENTS

| | | | |
|---|---|---|---|
| 2,840,440 | 6/1958 | McLaughlin et al. | 360/122 |
| 2,841,461 | 7/1958 | Gleason | 346/74.2 |
| 3,641,585 | 2/1972 | Hodges | 346/74.2 |
| 3,945,343 | 3/1976 | Berkowitz | 427/48 |
| 4,097,871 | 6/1978 | Berkowitz et al. | 346/74.5 |
| 4,138,702 | 2/1979 | Magnenet | 360/125 |
| 4,176,362 | 11/1979 | Nelson | 346/74.5 |

*Primary Examiner*—L. T. Hix
*Assistant Examiner*—Thomas H. Tarcza
*Attorney, Agent, or Firm*—Spensley, Horn, Jubas & Lubitz

[57] ABSTRACT

A magnetic print module for use as a printhead of a magnetic printing system. The print module comprises a base having a matrix of integral protrusions extending upward from the base and a plurality of coils wrapped around the base between the rows and columns of the matrix. By selectively energizing four coils at a time, a current path may be formed around one of the protrusions, which induces a magnetic field in the protrusion and permits it to print a dot in a recording medium. In order to form a printhead with minimal spacing between print positions, a matrix having a plurality of print rows may be formed and the matrix skewed with respect to the path of the recording medium.

14 Claims, 12 Drawing Figures

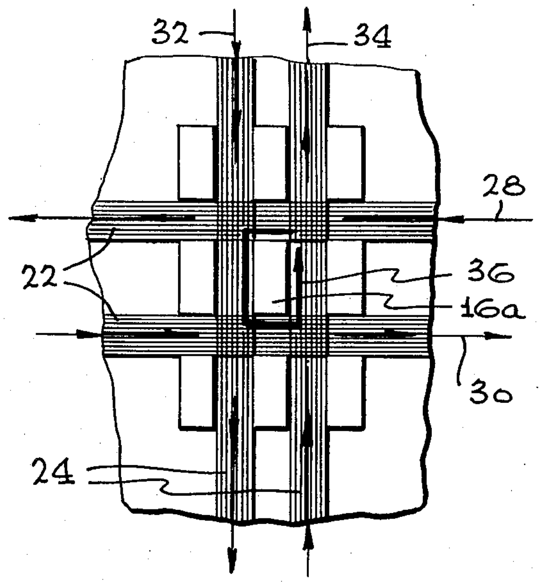
FIG. 4
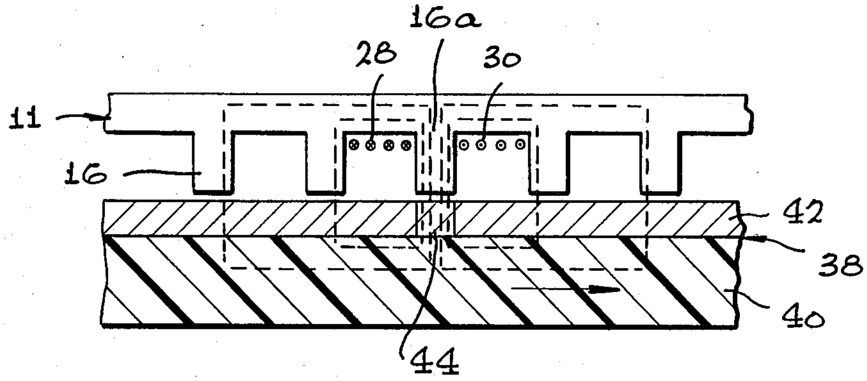
FIG. 5
FIG. 6
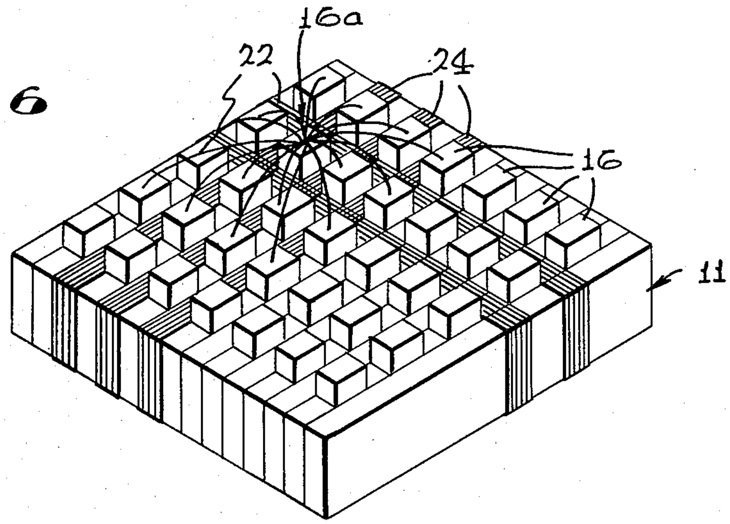

MAGNETIC PRINTER AND PRINTHEAD

BACKGROUND OF THE INVENTION

1. Field of the Invention

This invention relates to magnetic printers and printheads for use in magnetic printers.

In a typical magnetic printing machine, electrical signals are applied to magnetic recording heads which induce magnetic field variations in the surface of a moving magnetic recording medium. The field variations produce a latent magnetic image on the surface of the recording medium. The magnetic image will attract and retain magnetic ink particles. An ink toner, which is usually supplied in dry particulate form, is applied to the magnetic image and subsequently transferred to paper or other hard copy media. After transfer of the toner from the recording medium to the paper, the recording medium is cleaned of residual toner and erased to prepare it for recording of subsequent magnetic images.

Magnetic printing has several advantages over the more common electrostatic, or xerographic, printing technique. In electrostatic printing, toner particles are attracted to electric fields created by a latent charge image on a dielectric medium. The use of electrostatic fields requires the utilization of high voltages, which creates many potential problems. In addition, many electrostatic printers employ lasers with precision focusing systems, precision scanning systems, servo motor drum control, servo motor paper feed systems and elaborate light shielding, all of which increase the cost of such printers. Magnetic printing, on the other hand, utilizes magnetic rather than electrostatic fields and thus does not require high operating voltages. Furthermore, magnetic printers are mechanically much simpler than electrostatic printers (e.g., simple friction drive is used to synchronize paper and printing drum motion). Potentially, therefore, magnetic printing can be significantly simpler and less expensive than electrostatic printing.

2. Description of the Prior Art

One of the major difficulties which has heretofore prevented the use of magnetic printers is the design of the recording head which records an image onto the recording medium. Unlike recording heads which are used in magnetic audio and video tape recorders and the like, a recording head for a magnetic printer must be extremely wide and include a plurality of print positions across the width of the head in order to record the required image onto the recording medium as it moves past the head. Whereas the maximum tape width used in magnetic tape recorders is generally 1 inch, a magnetic printer is required to print an image having a width on the order of 8½ inches (standard paper width) or greater. Using typical magnetic recording heads, the current demands for such printing requirements become excessive. In addition, wear problems become critical, and the cost of such heads is extremely high.

One type of head which is designed specifically for use with magnetic printers is disclosed in U.S. Pat. No. 4,138,702 to Magnenet, issued Feb. 6, 1979. In contrast to the normal recording head, which utilizes leakage of magnetic flux from a small gap in a magnetic circuit, the head arrangement disclosed by this patent incorporates an electromagnet having a core which has a recording pole and a flux closing pole, both of which are perpendicular to the surface of the recording medium. The electromagnet forms a closed magnetic circuit with the recording medium in which the magnetic flux is substantially perpendicular to the surface of the recording medium. The flux passes from the recording pole through the recording medium and back to the flux closing pole. The cross-section of the recording pole is much smaller than that of the flux closing pole, thereby causing its flux density to be much greater. The head is designed so that the flux density at the recording pole is sufficient to form a magnetic image on the recording medium, but the flux density on the flux closing pole is insufficient to record an image onto the recording medium.

Although the above design overcomes many of the problems encountered with typical magnetic recording heads when used in magnetic printing, several problems remain. Chief among these is the complexity of connections which result when a plurality of printheads are used. The physical construction of the Magnenet printhead is such that it is difficult to achieve the high density which is required in magnetic printing. Since the printer operates as a dot printer, whereby a plurality of very small closely spaced dots are printed on the recording medium in a predetermined arrangement as the medium moves past the head in order to form the magnetic image, an individual recording head is required for the formation of each dot. Thus, a printhead for a magnetic printer actually incorporates a plurality of individual recording heads, each of which prints at a particular position along a line which is transverse to the direction of travel of the recording medium. For high quality printing, a density on the order of 240 dots per inch is required. The complexity of electrical connections needed to meet such requirements can become excessive. It is a primary object of the present invention to provide a printhead which has a physical configuration that achieves the high dot density required for high quality magnetic printing while reducing the number of electrical connections. A further object of the present invention is to provide a design which can be fabricated by using unsophisticated machine tools, inexpensive components and can be mass produced inexpensively.

After the toner has been applied to the recording medium and subsequently transferred to the paper, any residual toner must be removed from the recording medium and the recording medium must be erased to prepare it for the recording of a subsequent image thereon. Typically, these two functions have been performed separately. The most common way of removing residual toner has been to use a scraper which physically contacts the recording medium and scrapes the residual toner away from the recording medium. The physical contact between the scraper and the recording medium reduces the life of both of these components. In addition, the physical contact causes the scraper and recording medium to form wear-matched surfaces, which requires that both of them be replaced simultaneously.

Some scrapers have been developed which do not physically contact the surface of the recording medium. One such scraper is disclosed in U.S. Pat. No. 3,945,343, issued to Berkowitz on Mar. 23, 1976. In this system, the scraper comprises a rotatable cylinder disposed around a multiple magnetic stator. The stator attracts residual toner to the rotating cylinder. As the cylinder rotates, the toner which located on it is removed by means of a blade which is biased against the surface of the cylinder.

The toner is then collected in a container. This system, although it effectively removes residual toner, does nothing to erase the recording medium so as to prepare it for subsequent recording of an image. A separate recording head is required to erase the recording medium.

It is another object of the present invention to provide a scraper which does not contact the recording medium and both removes residual toner and erases the recording medium.

SUMMARY OF THE INVENTION

The present invention is directed to a new printhead mechanism and a magnetic printer which incorporates them. The printhead comprises a plurality of modules, each module including a magnetizable base having a matrix of columns and rows of integral protrusions extending upward from the base. A first plurality of coils is wrapped around the base between the columns of the matrix and a second plurality of coils is wrapped around the base between the rows of the matrix. Each protrusion (other than those on the outside of the matrix) is thus surrounded by two of the first plurality of coils and two of the second plurality of coils. By passing current through each of the four coils in predetermined directions, a magnetic flux will be induced in the protrusion. The direction of the flux will be upward from the protrusion, i.e., away from the base.

A recording medium such as magnetic tape is passed across the module so that the magnetic flux from the protrusion will pass through the recording medium. The protrusions which surround the protrusions in which the flux is induced form return paths for the flux. Because the return path for the flux includes a plurality of protrusions, the flux density in the first protrusion will be much greater than that in the other protrusion. The high flux density in the protrusion in which the flux is induced is sufficient to write a dot onto the recording medium. The relatively low flux density in the surrounding protrusion, however, is not sufficient to cause any writing. By selectively energizing the coils, a flux may be induced in any of the interior protrusions and information (dots) written onto the recording media at a location corresponding to the protrusions.

In order to reduce the distance between dot positions the matrix of each module may be skewed with respect to the path of the recording medium so that each of the protrusions which prints information lies along a different line in the direction of travel of the recording medium. By proper sequential energization of different coils, it is possible to print along the entire width of the recording medium. Proper control of the geometry of each matrix enables all of the print positions across the recording medium to be equidistant from adjacent positions.

BRIEF DESCRIPTION OF THE DRAWING

In the drawings:

FIG. 4 is a top schematic view showing currents which are used to induce a magnetic flux in a protrusion;

FIG. 5 is a side plan view showing flux paths induced in the printhead;

FIG. 6 is perspective view of a portion of the printhead module showing flux paths induced in the printhead;

DETAILED DESCRIPTION OF THE PREFERRED EMBODIMENTS

Figure 1:
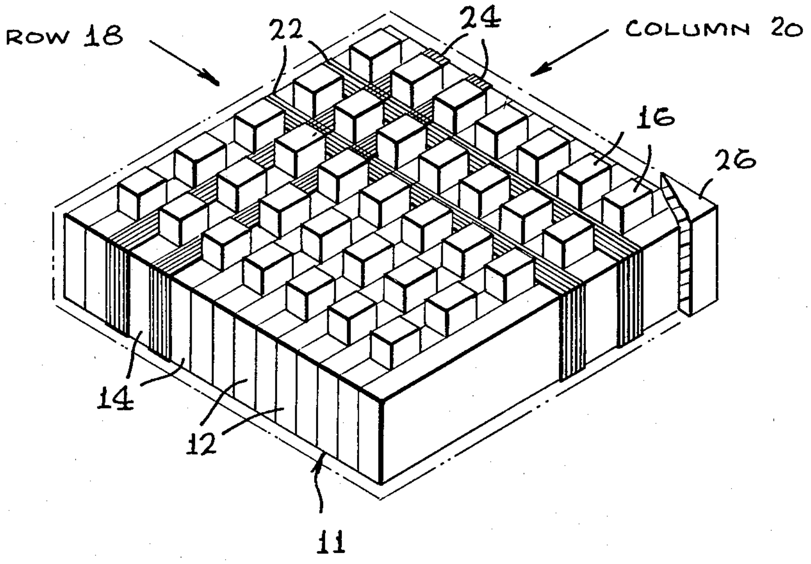
FIG. 1 is a perspective view of a printhead module of the present invention.
Figure 2:
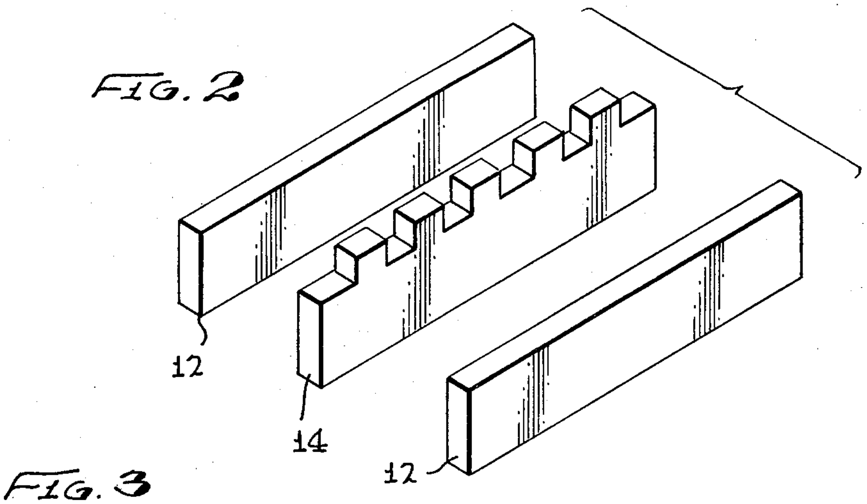
FIG. 2 is a perspective view showing laminations which are used to make the printhead module.

Referring to FIGS. 1 and 2, a print head module 10 includes a base 11 which is formed by laminating a plurality of alternating plates 12 and 14 which are made of a ferromagnetic material such as silicon iron (chosen for its high permeability and high resistivity). Each of the laminations 14 includes a plurality of equally spaced needle-like protrusions 16 which extend upward from the tops of the lamination 14. Although the base 11 could be constructed from a single block of material, the use of laminations minimizes the effects of eddy currents which are produced within the base 11. In addition, the use of the alternating laminations 12 and 14 is a convenient way to manufacture the base 11 so as to include the protrusions 16. The protrusions 16 of different laminations 14 are spaced from one another by means of the interleaved laminations 12. The laminations 14 are positioned so that the protrusions 16 are arranged in a plurality of rows 18. The protrusions 16 on each lamination 14 comprise a column 20. Thus the module 10 includes a base 11 having a matrix of rows 18 and columns 20 of protrusions 16 which extend upward from the top of the base 11.

A plurality of coils 22 are wrapped around the base and pass between each of the rows 18 of the matrix of protrusions 16. Only one coil 22 is located between each adjacent row 18. Similarly, a plurality of coils 24 are wrapped around the base 11 and pass between the columns 20 of the matrix. One coil 24 passes between each adjacent column of the matrix. In order to protect the protrusions 16 and the coils 22 and 24, the module 10 may be encapsulated in a material such as aluminized epoxy 26.

Figure 3:
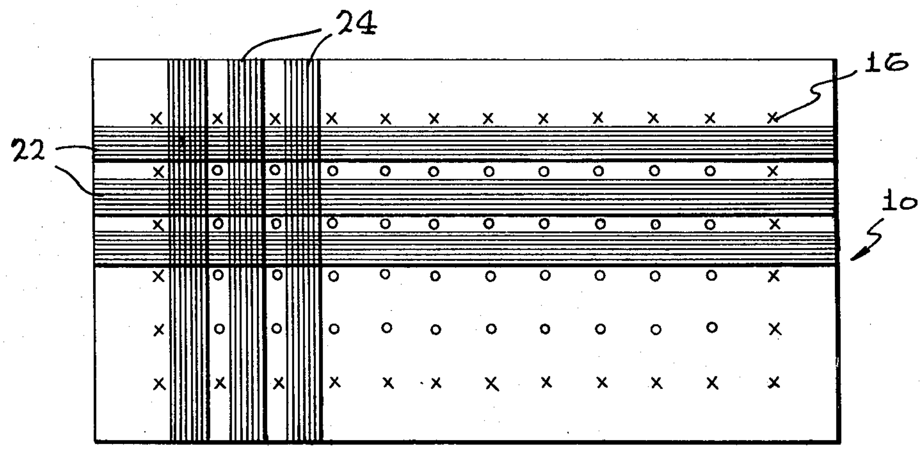
FIG. 3 is a top plan view of the printhead module showing the matrix arrangement of protrusions.

Referring now to FIG. 3, each of the protrusions 16 on the outside of the matrix is designated by an "X" and each of the protrusions 16 on the inside of the matrix is designated by an "O". The outside protrusions 16 are not entirely surrounded by the coils 22 and 24, and are not used to generate write signals. Each of the interior protrusions 16 is surrounded on all sides by a pair of adjacent coils 22 and a pair of adjacent coils 24. By controlling currents which pass through the coils 22 and 24 which surround any particular protrusion 16, it is possible to induce a magnetic flux in that protrusion 16. As may be seen in FIG. 4, a protrusion 16*a* is surrounded by two horizontal coils 22 and two vertical coils 24. Currents 28 and 30 are passed through the coils 22 and currents 32 and 34 are passed through the coils 24 in order to establish current circulation 36 which surrounds the protrusion 16*a*. The current 36 induces a magnetic flux in the protrusion 16*a*. The flux induced in the protrusion 16*a* enables information to be written onto a magnetic recording medium.

Referring now to FIG. 5, a magnetic recording medium 38 may be a magnetic tape which includes a substrate 40, made of a material such as mylar, and a magnetic oxide coating 42. The tape 38 is positioned so that the oxide layer 42 is adjacent the protrusions 16. When the current circulation 36 is generated around the protrusion 16A, a magnetic circuit is created having a flux path which leaves the protrusion 16*a* and passes through the oxide layer 42 and returns to the nonenergized protrusions 16 which surround the protrusion 16*a*. The flux density in the protrusion 16*a* is quite high and is therefore sufficient to write (i.e., magnetize) a dot into the area 44 of the oxide layer 42 adjacent the protrusion 16*a*. Because of the large number of protrusions 16 which surround the protrusion 16*a* (and thus large magnetic flux return path area), the flux density of the portion of return path in each of the protrusions 16 will be quite low. The flux density of the return path will be insufficient to cause saturation of the magnetic oxide layer 42, and thus writing will occur only in the area 44 which is adjacent the protrusion 16*a*. The matrix thus in effect constitutes a recording head which has a pole of small cross-sectional area (a single energized protrusion) and a return pole of large cross-sectional area (all of the surrounding protrusions).

Referring to FIG. 6, the difference in flux density between the protrusion 16*a* and the surrounding protrusions 16 can be seen. By energizing different ones of the coils 22 and 24, any of the interior protrusions 16 of the matrix may be activated in order to print a dot on the oxide layer 42 adjacent to that particular protrusion 16. It should be noted, however, that in order to insure a return path which has a large cross-sectional area and therefore low flux density, only one protrusion 16 within a given area (e.g., a four by four square) should be activated at one time. This can be accomplished by the use of appropriate control circuitry for the matrix.

Figure 7A:
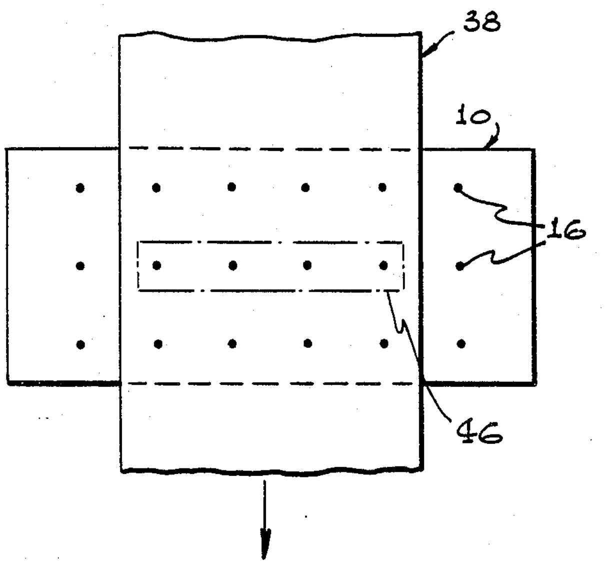
FIG. 7*a* is a plan view showing a printhead arrangement with respect to the path of a recording medium.

Referring now to FIG. 7*a*, as the tape 38 moves past the print module 10, all that is required is that the module 10 be able to print a line of dots across the width of the tape 38. Under normal circumstances, this can be accomplished by providing a module 10 which has a single row 46 of protrusions which actually print, and surrounding protrusions 16 which provide (along with nonactivated protrusions in the row 46) a return path having a large cross-sectional area for the flux created by one of the protrusions 16 in the row 46. However, there are limitations with respect to how small the distance between adjacent protrusions 16 can be made. For some applications, the spacing between dots must be less than the minimum practicable distance between adjacent protrusions 16. In order to enable dots to be printed at intervals smaller than the smallest spacing between protrusions 16, a matrix assembly of more than one row of printing protrusions is utilized.

Figure 7B:
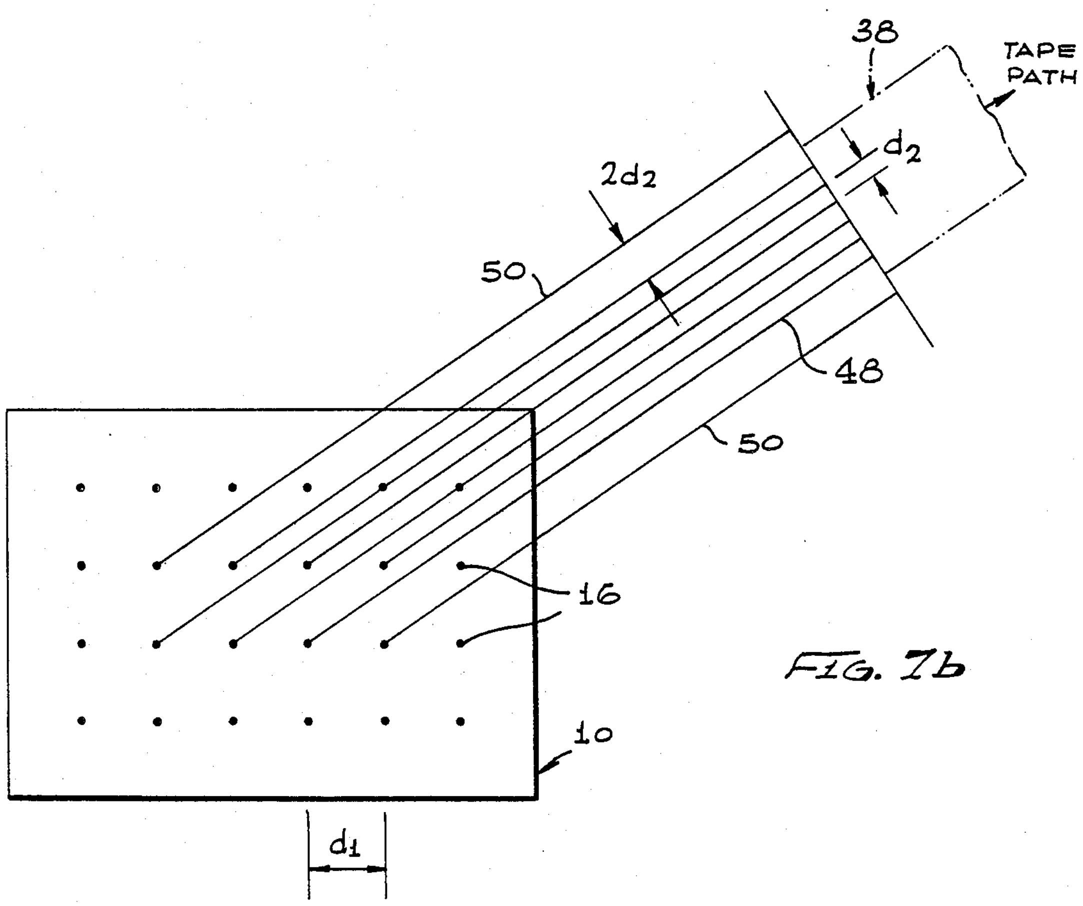
FIG. 7*b* is a plan view showing an alternate geometric configuration of a printhead.

As shown in FIG. 7*b*, by skewing the print module 10 with respect to the path of the tape 38, the space between printing positions may be reduced, as shown by lines 48. It can be clearly seen that the distance $d_1$ between adjacent protrusions 16 is much greater than the distance $d_2$ between actual printing positions. It should be noted that the skewing of the print module 10 prevents printing from being accomplished in a single line transverse to the direction of tape travel. This, however, only presents a problem of timing, which may be overcome with suitable control circuitry. The skewing of the print module 10 provides a plurality of evenly and closely spaced print positions across the width of the tape 38.

Figures 7C, 8:
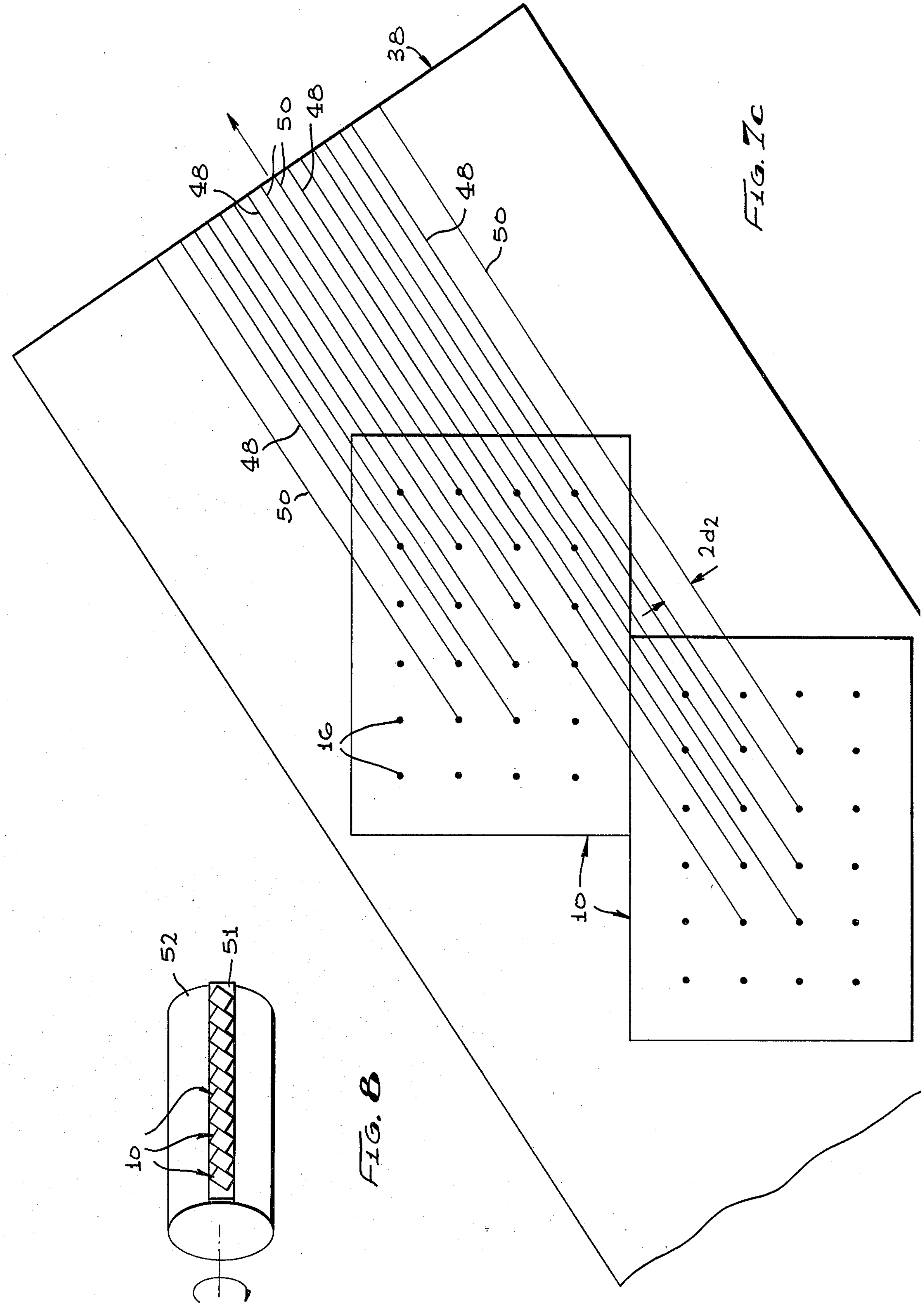
FIG. 7*c* is a plan view of a pair of printhead modules.
FIG. 8 is a perspective view showing a printhead arrangement with respect to a recording drum.

Although the distance between print positions may be decreased by skewing the module 10, as the width of the recording medium increases, the skewing may cause the print head to occupy too much distance along the path of the recording medium. This is especially critical if a drum is used as the recording medium, since the skewing would require that the printhead spiral around the drum in order to remain close to its surface. This problem may be overcome by utilizing a plurality of adjacent print modules. However, as can be seen in FIG. 7*b*, the outside print positions, denoted by lines 50, are spaced from the adjacent print lines 48 by a distance of $2d_2$. If equally spaced print positions are required, the modules cannot simply be placed side by side. By properly positioning multiple print modules 10, as shown in FIG. 7*c*, the print lines may be arranged so that they overlap, thus resulting in a large number of equally spaced print positions. As shown in FIG. 8, a large group of modules 10 may be positioned to form a printhead 51 which extends across the entire width of a recording medium such as a drum 52. Thus, it can be seen that by proper orientation of the print modules 10, a printhead may be designed which achieves very close print spacing and extends across the entire width of a wide recording medium.

Figure 9:
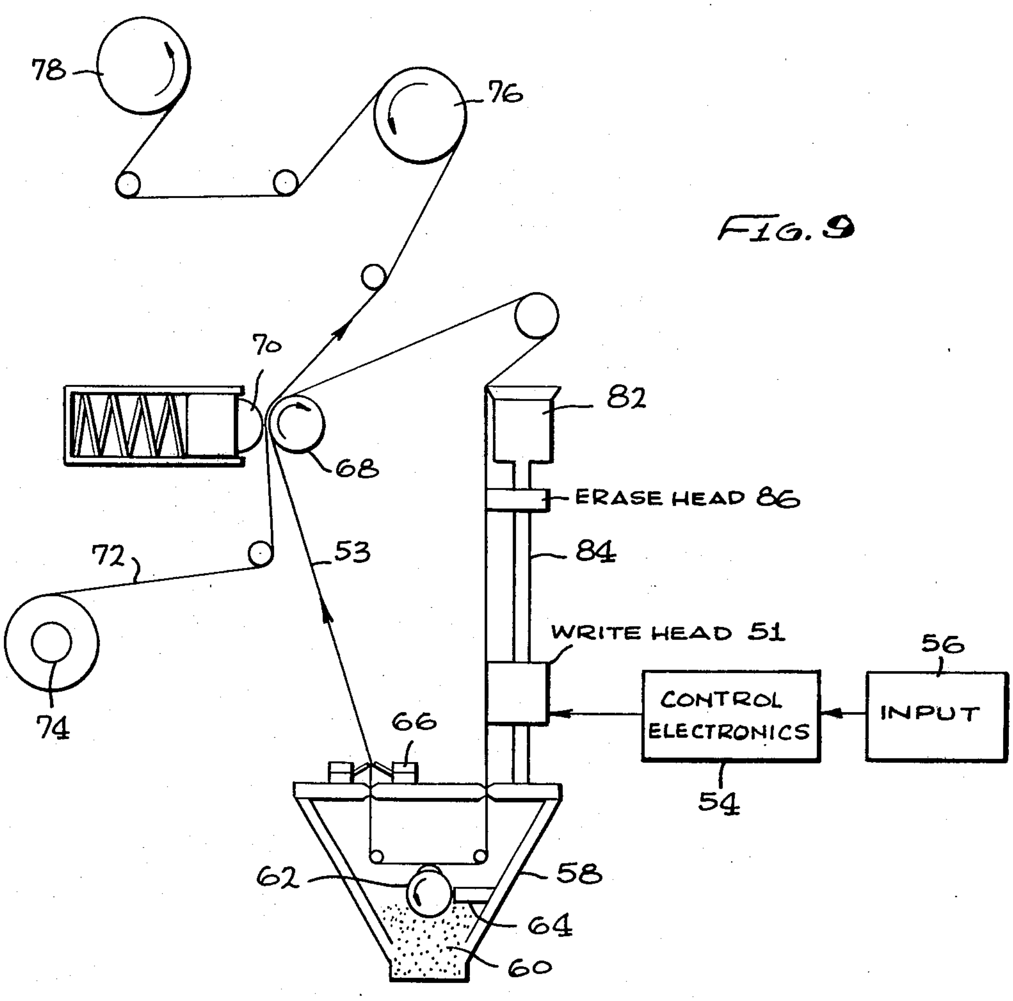
FIG. 9 is a side plan view of a magnetic printing system utilizing a loop of magnetic tape.

Referring now to FIG. 9, a magnetic printing system utilizing a tape as the recording medium is shown. A tape loop 53 is passed by a write head 51 which is designed according to the present invention. The write head 51 is controlled by a control electronics section 54 which receives an input signal 56. As the tape loop 50 moves past the write head 51, the protrusions (not shown) of the write head 51 are selectively energized so as to form a magnetic image on the tape 53. After the tape 53 has passed the write head 51, it passes through a toner box 58, where a toner 60 is presented to the tape 53 by means of a rotating cylinder 62. The amount of toner 60 presented to the tape 53 is controlled by an adjustable bar 64. The magnetized portions of the tape 53 attract toner particles and form a latent image with the toner particles. The tape 53 is passed through a pair of valvet pads 66 and up to a paper and tape drive roller 68. The roller 68 imparts motion to the tape 53 to move it around the loop. A pressure roller 70 forces paper 72 which is supplied from a spool 74 against the tape 53. The rotation of the drive roller 68 also imparts motion to the paper 72. As the tape 53 and paper 72 move between the rollers 68 and 70, the toner particles are transferred to the paper 72 from the tape 53. The paper 72 then passes to a heat fix station 76 where the image on the paper is permanently fixed by the application of heat. The paper is then collected on a paper collection spool 78.

After the tape 53 passes the drive roller 68, it passes around a tape guide 80 to a scraper 82, which removes residual toner particles from the tape 53. These residual particles are returned to the toner box 58 by means of a chute 84. The tape 53 then passes an erase head 86, where it is magnetically erased. At this point, the tape is ready to have a subsequent image recorded on it by the write head 51.

Figure 10:
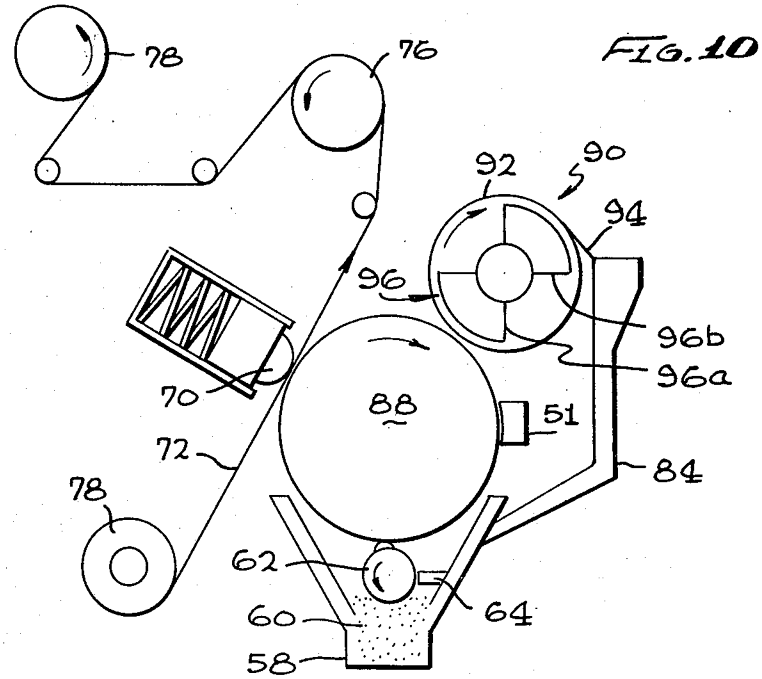
FIG. 10 is a side plan view showing a magnetic printing system utilizing a magnetic cylinder.

Referring now to FIG. 10, a magnetic printer system utilizing a drum as the recording medium is shown. The operation of this system is the same as the tape system, with two exceptions. The tape loop 53 of the system of FIG. 9 has been replaced by a rotating drum 88 upon which a magnetic image is formed by the write head 51. In addition, instead of employing a separate scraper and erase head, a combination scraper/eraser 90 is used. The scraper/eraser 90 includes a cylinder 92, which in the preferred embodiment of the invention is made of aluminium, and has a flange 94 which extends downward from the top of the cylinder 92 to the return chute 84. Located within the cylinder 92 is a rotatable magnet 96. The magnet 96 rotates in the direction of the flange (i.e., clockwise as shown in FIG. 10). The magnet 96 which is utilized in the present embodiment is a ceramic magnet which develops a field of about 70 milliteslas on the outside of the cylinder 92. The magnet 96 has a pair of radial sections *96a* and *96b* so that its rotation sets up a rotating magnetic field. The magnetic field of the magnet 96 will attract toner particles from the drum to the outside surface of the cylinder 92. As the magnet 96 rotates, the toner particles will be moved around the surface of the cylinder 92 and eventually along the outside (top) of the flange 94. As the particles move along the flange 94, they will move away from the magnet 96, eventually causing the magnetic force to be insufficient to hold them to the flange 94. Ultimately, the force of gravity will cause the toner particles to fall into the return chute 84 and return to the toner box 58. The rotation of the magnet 96 will also result in the erasure of the magnetic image on the drum 88. The scraper/eraser 90 thus performs both the functions of erasing the drum 88 and removing residual toner particles in a very simple fashion. It should be noted that the scraper/eraser 90 can also be employed with a tape loop system such as that shown in FIG. 9.

In summary, the present invention is directed to a magnetic printhead and a magnetic printing system utilizing the printhead. The printhead comprises a base having a matrix of integral protrusions extending from the top of the base. The matrix includes one or more rows of protrusions which are utilized to print dots onto a recording medium. Coils are wound around the base and in between the rows and columns of the matrix. By appropriately energizing different coils, a current path may be formed around an individual protrusion. The current path induces a flux in that protrusion which passes out of the protrusion and into a recording medium. The flux density is sufficient to cause saturation of the recording medium and thereby print a magnetic dot in the recording medium. The surrounding protrusions, which do not have a current flowing around them and therefore have no flux induced in them, provide a return path for the flux induced in the energized protrusion. Because of the large cross-sectional area of the surrounding protrusions in relation to the single energized protrusion, the flux density of the return path is insufficient to cause any writing to occur in the recording medium. The energization of the coils surrounding the base may be controlled so as to selectively write dots in different positions of the recording medium as it passes the printhead. By utilizing a matrix arrangement, the number of input wires required is greatly reduced, since each coil is used to energize more than one protrusion.

In order to increase the dot density which may be printed, the printhead may be formed having a plurality of rows of printing protrusions and skewed with respect to the path of the recording medium. In addition, a plurality of print modules may be combined to form a wide print head.

The printing system of the present invention also includes a combination scraper and eraser to remove residual toner from the recording medium and to magnetically erase the recording medium prior to the formation of a subsequent image thereon. The scraper includes a stationary hollow cylinder having a flange extending away from it and a rotatable magnet located within the cylinder. The cylinder surface is positioned close to the recording medium and the rotation of the magnet attracts residual toner and moves it around the surface of the cylinder until it slides off of the flange. The rotation of the magnet also causes erasure of the magnetic recording medium.

Although particular embodiments of the invention have been described and illustrated herein, it is recognized that modifications and variations may readily occur to those skilled in the art and consequently it is intended that the claims be interpreted to cover such modifications and equivalents.

We claim:

1. A printhead module for perpendicular magnetic printing comprising:

- a magnetizable base having a matrix of a plurality of columns and a plurality of rows of protrusions extending upward from the base;
- a plurality of first conductors, each extending between adjacent columns of said matrix; and a plurality of second conductors, each extending between adjacent rows of said matrix, whereby each protrusion within the interior of said matrix is surrounded by two of said first conductors and two of said second conductors, wherein in recording a selected one of the protrusions functions as a recording pole and protrusions surrounding the selected protrusion together function as a flux closing pole.

2. The printhead module of claim 1 wherein first and second pluralities of conductors are wire coils which are wrapped around said base.

3. The printhead module of claim 1 wherein said base comprises a plurality of first and second laminations, each of said first laminations including a plurality of said protrusions and defining a column of said matrix, wherein said first laminations are separated from one another by at least one of said second laminations.

4. The printhead module of claim 1 or 3 wherein said base is made of a silicon-iron alloy.

5. The printhead module of claims 1 or 3 wherein said printhead is encapsulated in a protective housing.

6. The printhead module of claim 5 wherein said housing is made of an aluminized epoxy.

7. A printhead module for a perpendicular magnetic printer comprising:

- a rectangular base formed from a plurality of vertical magnetizable laminations, alternating ones of said laminations including a plurality of equally-spaced integral protrusions extending from the tops of the laminations so as to form a matrix of a plurality of rows and a plurality of columns of said protrusions;
- a plurality of first conductive coils wrapped around said base, one each of said first coils passing between each pair of adjacent rows of said matrix; and
- a plurality of second conductive coils wrapped around said base, one each of said second coils passing between each pair of adjacent columns of said matrix, whereby appropriate energization of selected adjacent pairs of said first and second coils will set up a current circulation around a selected one of said protrusions, thereby inducing a magnetic flux in said protrusion to cause it to function as a recording pole, and wherein protrusions surrounding the selected protrusion together function as a flux closing pole.

8. The printhead module of claims 1 or 7 in combination with a magnetic recording medium which is movable past said module.

9. A magnetic printer comprising:

a movable recording medium upon which magnetic information can be recorded;

toner supply means, located adjacent said recording medium, for supplying toner to recorded portions of said recording medium;

copy supply means for supplying a hard copy material to which the toner on said recording medium is transferred;

scraper means for removing residual toner from said recording medium;

eraser means for erasing said recording medium; and a printhead for magnetically writing information across the width of said recording medium, said printhead including at least one print module comprising:

a magnetizable base having a matrix of a plurality of columns and a plurality of rows of protrusions extending upward from said base, a plurality of first conductors, each extending between adjacent rows of said matrix, and a plurality of second conductors, each extending between adjacent columns of said matrix, whereby energization of selected adjacent pairs of said first and second conductors will set up a current circulation around one of said protrusions, thereby inducing a magnetic flux in said protrusion, said magnetic flux passing into said recording medium substantially perpendicular to the surface of the recording medium to record information in a location adjacent said one protrusion, said flux returning to said base through a plurality of said protrusions which surround said one protrusion.

10. The printer of claim 9 wherein said matrix has a single row of protrusions in which flux is induced, each of said protrusions in said single row representing one printing position along the width of said recording medium.

11. The printer of claim 9 wherein said matrix has a plurality of rows of protrusions in which flux is induced and wherein said matrix is angled with respect to the path of said recording medium, each of said protrusions in said plurality of rows representing one print position along the width of said recording medium.

12. The printer of claim 11 wherein said printhead includes a plurality of said modules, wherein said modules are positioned in an overlapping relationship with respect to the path of said recording medium whereby said protrusions in which flux is induced represent a plurality of equally-spaced print positions along the width of said recording medium.

13. The printer of claims 9 or 12 wherein said recording medium comprises a rotatable drum.

14. The printer of claims 9 or 12 wherein said recording medium comprises a loop of magnetic recording tape.

* * * * *

UNITED STATES PATENT AND TRADEMARK OFFICE
CERTIFICATE OF CORRECTION

PATENT NO. : 4,380,768

DATED : April 19, 1983

INVENTOR(S) : Gaston Palombo, Stephen M. Fortescue and David Lappen

It is certified that error appears in the above-identified patent and that said Letters Patent are hereby corrected as shown below:

On the title page, Item [75] Inventors: delete "both" and insert therefor -- David Lappen, Stanford, all --.

Signed and Sealed this

*Ninth* Day of *August 1983*

[SEAL]

*Attest:*

GERALD J. MOSSINGHOFF

*Attesting Officer* *Commissioner of Patents and Trademarks*